US012522230B2

(12) United States Patent
Mueller et al.

(10) Patent No.: US 12,522,230 B2
(45) Date of Patent: Jan. 13, 2026

(54) METHOD FOR CONTROLLING A ROBOTIC DEVICE

(71) Applicant: Robert Bosch GmbH, Stuttgart (DE)

(72) Inventors: Johannes Christian Mueller, Stuttgart (DE); Andreas Schmidt, Stuttgart (DE); Koba Natroshvili, Waldbronn (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 18/670,801

(22) Filed: May 22, 2024

(65) Prior Publication Data

US 2024/0416934 A1 Dec. 19, 2024

(30) Foreign Application Priority Data

Jun. 13, 2023 (DE) ...................... 10 2023 205 459.0

(51) Int. Cl.
*B60W 50/06* (2006.01)
*B60W 50/00* (2006.01)
*B60W 60/00* (2020.01)

(52) U.S. Cl.
CPC ........ *B60W 50/06* (2013.01); *B60W 50/0097* (2013.01); *B60W 60/001* (2020.02)

(58) Field of Classification Search
CPC ............. B60W 50/06; B60W 50/0097; B60W 60/001; G06N 7/01; G06N 20/00; B25J 13/00; G05D 1/227
See application file for complete search history.

(56) References Cited

U.S. PATENT DOCUMENTS

2019/0294149 A1 9/2019 Kolouri et al.
2020/0334843 A1 10/2020 Kasuya et al.

FOREIGN PATENT DOCUMENTS

DE 19641261 C1 2/1998
DE 102004047130 A1 4/2006
DE 102015107391 A1 11/2016
(Continued)

OTHER PUBLICATIONS

Müller, "Motion Planning for Connected Automated Vehicles at Occluded Junctions With External Perception," Series of Publications of the Institute of Measurement, Control and Microtechnology, vol. 41, University of ULM, 2022, pp. 1-188.
(Continued)

*Primary Examiner* — Ashley L Redhead, Jr.
(74) *Attorney, Agent, or Firm* — Norton Rose Fulbright US LLP

(57) ABSTRACT

A method for controlling a robotic device. The method includes: training a control strategy for the robotic device based on a plurality of training control situations and, for each of a plurality of control time points, ascertaining information about an environment of the robotic device for the control time point; ascertaining a first consistency measure for the information ascertained for the control time point, by comparing a control situation specified by the information ascertained for the control time point, to the training control situations; ascertaining at least one second consistency measure for the information ascertained for the control time point; ascertaining a combined consistency measure by combining the first consistency measure with the at least one second consistency measure; and ascertaining one or more control actions for the robotic device depending on the combined consistency measure.

13 Claims, 4 Drawing Sheets

(56) References Cited

FOREIGN PATENT DOCUMENTS

| | | |
|---|---|---|
| DE | 102018222526 A1 | 6/2020 |
| DE | 102019215902 A1 | 5/2021 |
| DE | 102022204770 A1 | 11/2023 |
| EP | 3415943 A1 | 12/2018 |
| EP | 3477616 A1 | 5/2019 |

OTHER PUBLICATIONS

International Standard ISO 26262-1 Road vehicles—Functional safety, Part 1: Vocabulary (2018), pp. 1-42, ISO 2018.
International Standard ISO 21448 Road vehicles—Safety of the intended functionality (2019), ISO/PAS, pp. 1-64.

METHOD FOR CONTROLLING A ROBOTIC DEVICE

CROSS REFERENCE

The present application claims the benefit under 35 U.S.C. § 119 of German Patent Application No. DE 10 2023 205 459.0 filed on Jun. 13, 2023, which is expressly incorporated herein by reference in its entirety.

FIELD

The present disclosure relates to methods for controlling a robotic device.

BACKGROUND INFORMATION

Control strategies for robotic devices, such as autonomous vehicles, are typically trained on the basis of training data, i.e., they are trained for training control situations (or training scenarios), if artificial intelligence is used for this purpose. A control strategy thus trained can then be used on the assumption that it also provides good results for control situations not seen in the training, i.e., that it can generalize sufficiently. With suitable training data, this assumption is usually justified, but nonetheless, the case may occur that a control strategy is faced with a control situation for which it provides poor results because the input data it receives describe a control situation to which it cannot generalize, or also because the input data are of low quality, i.e., for example, describe the respective control situations poorly. Approaches for nevertheless achieving suitable (e.g., safe) control in such cases are therefore desirable.

The reference "Motion Planning for Connected Automated Vehicles at Occluded Junctions with External Perception" by Johannes Christian Müller, Series of publications of the Institute of Measurement, Control and Microtechnology, volume 41, Universität Ulm [University of Ulm], 2022, hereinafter referred to as reference [1], describes a subjective-logic-based method for assessing the reliability of external perception in automated driving.

SUMMARY

According to various embodiments of the present invention, a method for controlling a robotic device is provided, comprising training a control strategy for the robotic device on the basis of a plurality of training control situations and, for each of a plurality of control time points, ascertaining information about an environment of the robotic device for the control time point;

ascertaining a first consistency measure for the information ascertained for the control time point, by comparing a control situation specified by the information ascertained for the control time point, to the training control situations;

ascertaining at least one second consistency measure for the information ascertained for the control time point, by comparing the information ascertained for the control time point, to a prediction for the state of the environment from information about the environment of the robotic device for one or more previous control time points;

to prior knowledge;

to one another; and/or to the information ascertained for one or more previous control time points;

ascertaining a combined consistency measure by combining the first consistency measure with the at least one second consistency measure; and ascertaining one or more control actions for the robotic device depending on the combined consistency measure.

The method according to the present invention described above makes safe control possible since the case is taken into account that current information about an environment of the robotic device to be controlled is not consistent with regard to various aspects (e.g., with one another, with prior knowledge, or with training situations). If low consistency is detected (e.g., a combined consistency measure below a specified threshold value), controlling (e.g., driving cautiously) can take place according to a safe mode, and a safe control can thus be achieved in cases in which unsuitable information for the respective control is available.

Various embodiment examples of the present invention are specified below.

Embodiment example 1 is a method for controlling a robot, as described above.

Embodiment example 2 is a method according to embodiment example 1, wherein the first consistency measure and the at least one second consistency measure are subjective logic opinions, and combining the first consistency measure with the at least one second consistency measure is a fusion in the sense of at least one subjective logic fusion operator.

By means of subjective logic, the consistency assessment can explicitly take into account the epistemic uncertainty. It is thus suitable for the modeling and analysis of situations (in the present application, control situations) with uncertainty and unreliable sources (in the present application, for example, sensors). In the following, the usual English terms, in particular for the operators, are used in connection with subjective logic, as they are also used in reference [1], for example.

Embodiment example 3 is a method according to embodiment example 2, wherein the first consistency measure and the at least one second consistency measure are combined by applying the uncertainty weighted average belief fusion operator.

This makes it possible to take into account an uncertainty in the assessment of the consistency, and it can be avoided that an (unsafe) score indicating good consistency negatively influences the control, for example does not result in cautious driving behavior, even if such behavior were appropriate since the consistency is actually low.

Embodiment example 4 is a method according to embodiment example 1, wherein the first consistency measure and the second consistency measure are Dempster-Shafer belief masses.

Embodiment example 5 is a method according to embodiment example 1, wherein the first consistency measure and the second consistency measure are determined by means of Bayesian inference.

Alternatives to the use of subjective logic are Dempster-Shafer and Bayesian inference, which can likewise provide consistency measures in order to achieve suitable (e.g., safe) control.

Embodiment example 6 is a method according to one of embodiment examples 1 to 5, wherein combining the first consistency measure with the at least one second consistency measure comprises temporally filtering the first consistency measure and/or the second consistency measure and combining the first consistency measure or filtered first consistency measure with the second consistency measure or filtered second consistency measure.

Temporal filtering makes it possible to filter out jumps in the consistency score due to an incorrect (e.g., particularly pessimistic) consistency score. All or also only one or (in the case of a plurality of second consistency measures) a portion of the consistency measures can be filtered before the (actual) combination takes place.

Embodiment example 7 is a method according to embodiment example 4, wherein the first consistency measure and the at least one second consistency measure are subjective logic opinions and the first consistency measure and/or the at least one second consistency measure are temporally filtered by applying the cumulative belief fusion operator.

In the event of a jump, the uncertainty of the consistency score typically increases sharply and is therefore weighted less strongly by this fusion operator, which takes into account that, immediately after a jump, the validity of the corresponding consistency measure is typically low.

Embodiment example 8 is a method according to embodiment example 7, wherein, when temporally filtering the first consistency measure and/or the at least one second consistency measure, a current value of the consistency measure is taken as a result of the temporal filtering for the respective consistency measure if the result of a degree of conflict with a previous result of the filtering is above a specified threshold value.

Embodiment example 9 is a method according to one of embodiment examples 1 to 8, wherein the first consistency measure and/or the at least one second consistency measure is ascertained on the basis of a plurality of measurement values, wherein the significance of the measurement values is reduced depending on their correlation by means of a confidence reduction.

For example, it can be taken into account that a plurality of measurement values originate from the same data source (e.g., from the same sensor), and it can be avoided that errors of the data source falsify the consistency measure.

Embodiment example 10 is a method according to one of embodiment examples 1 to 9, wherein the information includes an environmental model.

In particular, the consistency of information derived from sensor data, such as object detections or trajectory predictions, can be assessed.

Embodiment example 11 is a method according to one of embodiment examples 1 to 10, wherein ascertaining the one or more control actions depending on the combined consistency measure comprises ascertaining the one or more control actions on the basis of a quality function which assesses control actions and includes the combined consistency measure.

In other words, for example, possible control actions are assessed on the basis of a quality function which includes the combined consistency measure, and one or more control actions (with the best score) are selected accordingly. The combined consistency measure can thus be effectively taken into account without necessarily having to provide hard limits (such as a threshold value comparison for the consistency).

Embodiment example 12 is a control unit configured to perform a method according to one of embodiment examples 1 to 11.

Embodiment example 13 is a computer program comprising commands that, when executed by a processor, cause the processor to perform a method according to one of embodiment examples 1 to 11.

Embodiment example 14 is a computer-readable medium which stores commands that, when executed by a processor, cause the processor to perform a method according to one of embodiment examples 1 to 11.

In the figures, similar reference signs generally refer to the same parts throughout the different views. The figures are not necessarily to scale, with emphasis generally being placed instead on representing the principles of the present invention. In the following description, various aspects of the present invention are described with reference to the figures.

DETAILED DESCRIPTION OF EXAMPLE EMBODIMENTS

The following detailed description relates to the accompanying drawings, which, for clarification, show specific details and aspects of this disclosure in which the present invention can be implemented. Other aspects can be used, and structural, logical, and electrical changes can be carried out without departing from the scope of protection of the present invention. The various aspects of this disclosure are not necessarily mutually exclusive since some aspects of this disclosure can be combined with one or more other aspects of this disclosure in order to form new aspects.

Various examples are described in more detail below.

Figure 1:
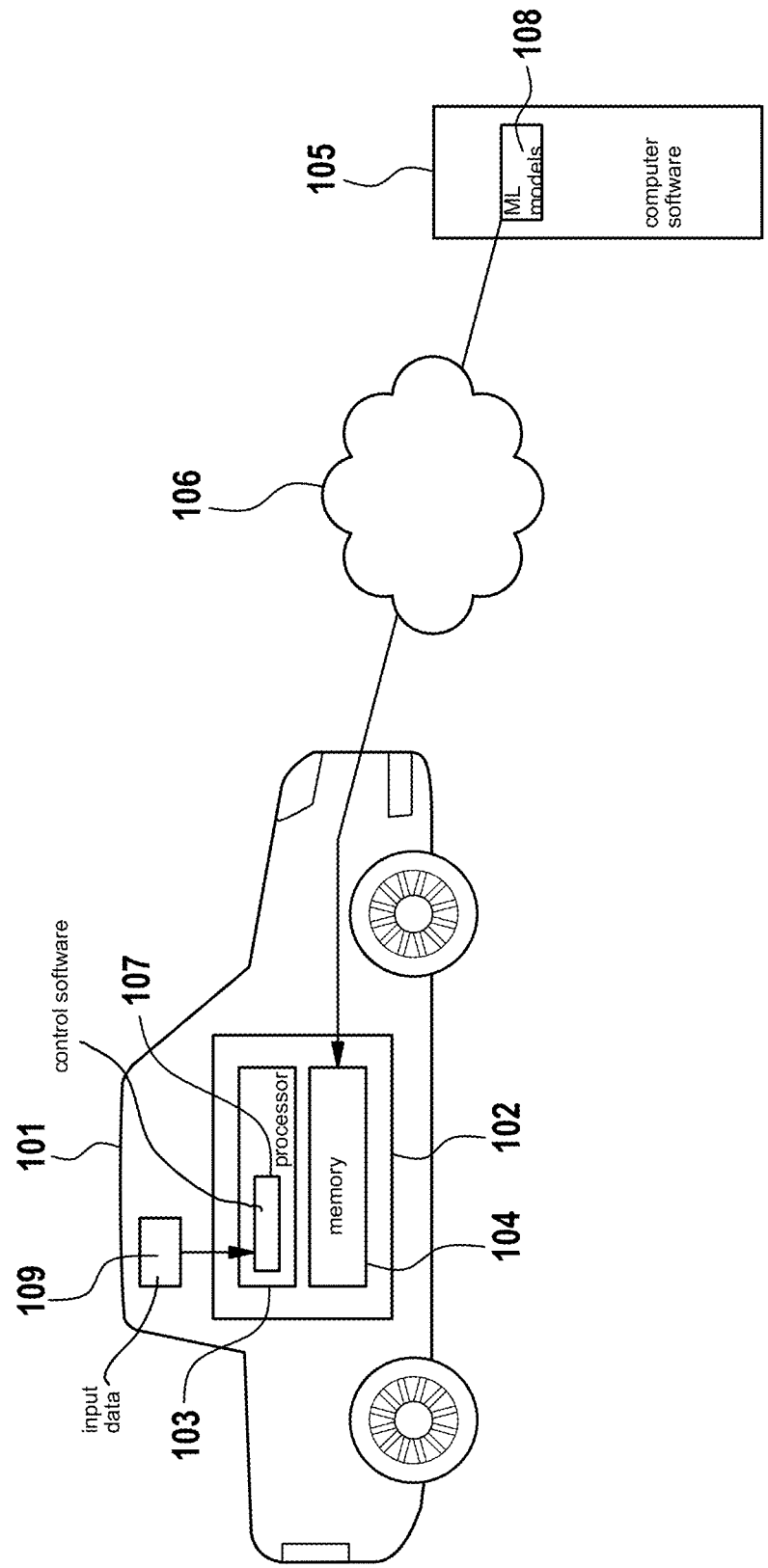
FIG. 1 shows a vehicle according to an example embodiment of the present invention.

FIG. 1 shows a vehicle 101.

In the example of FIG. 1, a vehicle 101, for example a passenger car or truck, is provided with a vehicle control unit (e.g., an electronic control unit (ECU)) 102.

The vehicle control unit 102 comprises data processing components, e.g., a processor (e.g., a CPU (central processing unit)) 103 and a memory 104 for storing control software 107 according to which the vehicle control unit 102 operates, and data that are processed by the processor 103. The processor 103 executes the control software 107.

For example, the stored control software (computer program) comprises instructions that, when executed by the processor, cause the processor 103 to execute driver assistance functions or even to control the vehicle autonomously.

The control software 107 is, for example, transmitted from a computer system 105, for example via a network 106 (or also by means of a storage medium such as a memory card), to the vehicle 101. This can also take place in operation (or at least when the vehicle 101 is with the user) since the control software 107 is updated over time to new versions, for example.

The control software 107 can, for example, be trained by means of machine learning (ML), i.e., the control software 107 implements one or more ML models 108 (or machine learning model), which is trained on the basis of training data, by computer system 105 in this example. The computer system 105 thus implements an ML training algorithm for training the one or more ML models 108.

The control software 107 ascertains control actions for the vehicle (such as steering actions, braking actions, etc.) from input data 109 that are available to it and that contain information about the environment or from which it derives information about the environment (for example, by detecting other road users, e.g., other vehicles). These data are, for example, sensor data, such as information obtained from a camera of the vehicle or also via communication with other vehicles or devices on the roadside.

In road traffic, it is a common occurrence that a vehicle is in an unfamiliar situation that was not anticipated at the design time of the control software and, specifically, the training time of the one or more ML models 108. Human drivers typically have a gut feeling on the basis of their experience, which makes them drive with extra caution in such situations. However, automated vehicles (i.e., control software) typically lacks such a mechanism.

According to various embodiments, a mechanism is provided, by means of which automated vehicles (or also other agents, in particular other types of robotic devices) can respond anticipatively to unfamiliar situations. For example, the mechanism allows an automated vehicle to respond to unknown or critical situations with a particularly cautious manner of driving. This can mitigate some unknown, critical situations (e.g., in the sense of ISO 21 448 Safety of the Intended Functionality), which makes a safety possible beyond the safety in the sense of ISO 21212 Functional Safety.

For this purpose, according to various embodiments, the information available to the vehicle (or other agent), i.e., the input data 109 for the control software 107 but also data derived therefrom (information about the environment), such as trajectory estimates for other road users or detected objects, are checked for consistency (e.g., more up-to-date with previous or training data) with respect to at least one aspect. In order to check the consistency, probabilistic consistency measures are established for the individual aspects. If a plurality of aspects is taken into account, the individual aspects are fused to form a total result. The result of the analysis module is passed to a planning module and affects the driving behavior there so that the less consistent the information available to the automated vehicle is, the more cautiously (and thus predictively) the automated vehicle drives.

Various approaches, e.g., subjective logic, Dempster-Shafer theory, or Bayesian inference, can be used for modeling the probabilistic consistency measures. Various embodiment examples on the basis of subjective logic are explained below. However, the embodiment examples can be realized analogously by means of the other approaches.

Example Embodiment 1 for Consistency Measure:
Consistency Measure from Comparison with
Known, Critical and Non-Critical, Situations by
Means of a Variational Autoencoder In this embodiment example, the consistency of the available information (e.g., the input data 109 in the case of the example of FIG. 1) with regard to empirical knowledge is assessed as an aspect.

To this end, a neural network (e.g., as one of the one or more ML models 108), for example a variational autoencoder (VAE) network, is trained first in order to achieve a compact representation of the input data in a feature space (e.g., the input data comprise a plurality of data points or data elements, each being mapped to a feature vector).

Figure 2:
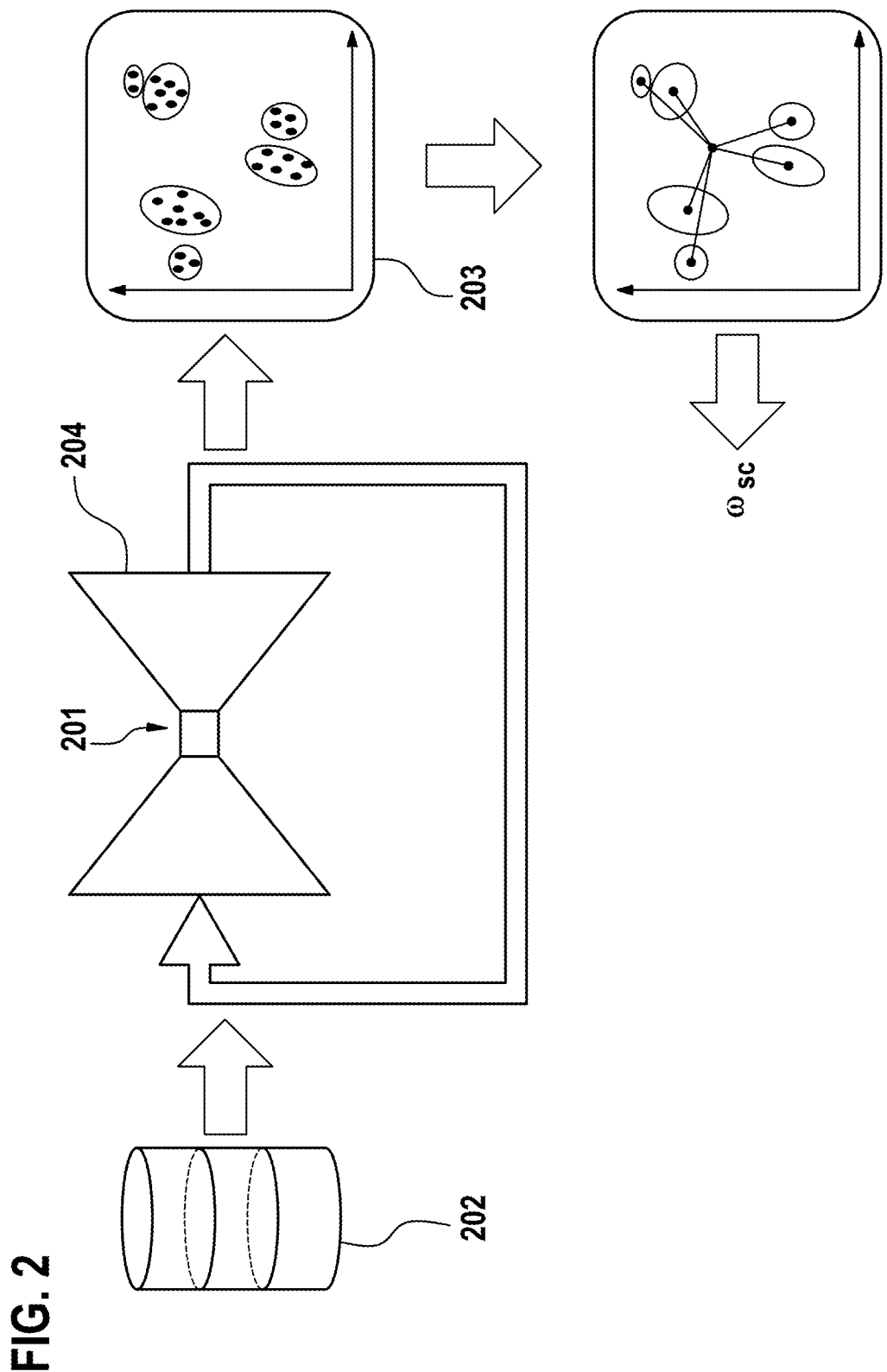
FIG. 2 illustrates the use of a VAE (variational autoencoder) to ascertain a consistency measure, according to an example embodiment of the present invention.

FIG. 2 illustrates the use of a VAE 201 to ascertain a consistency measure.

A training data set 202 which contains traffic scenarios that are classified as critical or non-critical is used for the training of the VAE 201. The data points of the training data set are clustered on the basis of the feature points in the feature space 203 to which they are mapped (i.e., clustering takes place according to a metric in the feature space 203). For example, the feature point to which an input data point (i.e., during training, a data point of the training data set) is mapped is the center point of the distribution that the VAE 201 provides for the input data point. A Gaussian fit of the data in the respective clusters is subsequently performed so that the resulting probability density distributions (i.e., fitted Gaussian distributions) represent the probability of belonging to the respective cluster. Accordingly, by design, the probability of a data point belonging to a cluster is derived directly from the Mahalanobis distance of the feature point of the data point to the corresponding cluster.

Online (i.e., in operation, in the present application example when controlling the vehicle), the input data 109 (e.g., perception information) are transformed into the feature space 203 by means of the encoder of the VAE 201, and a consistency measure is derived therefrom, for example as follows: The consistency measure for a situation s described, for example, by a data point of the input data 109 (i.e., the measure of the consistency with the training data 202) is expressed in this embodiment example by a binomial subjective logic opinion ω(b,d,u,a). Subjective logic is a mathematical theory that broadens the classical theory of probability. The binomial epistemic subjective logic opinion ω(b,d,u,a) is calculated for the situation s, which is described by a data point of the input data 109, as follows:

$$u = 1 - b - d,$$

$$a = [a_{prior}, 1 - a_{prior}]$$

Here, b denotes the belief mass, which is formed from the maximum probability of the situation s (i.e., of the corresponding data point) belonging to a cluster $C_{non\text{-}critical}$ of situations labeled non-critical, d denotes the disbelief mass, which is ascertained from the maximum probability of the situation s (i.e., of the corresponding data point) belonging to a cluster $C_{critical}$ with situations labeled critical, and u denotes the epistemic uncertainty. In order to ascertain these different types of clusters, data points are marked (i.e., labeled) as critical (i.e., as representing a critical situation) or non-critical (i.e., as representing a non-critical situation) in the training data set 202.

The closer a data point (or its assigned feature point) is to a cluster (e.g., in the sense of the Mahalanobis distance to the Gaussian distribution fitted to the cluster), the greater the probability of belonging and thus the respective belief mass.

The prior distribution is characterized by the parameter $a_{prior}$, which provides the possibility of including expert knowledge or prior knowledge. Without specific prior knowledge, the parameter $a_{prior}$ is set to 0.5, which in subjective logic theory represents the absence of prior knowledge. Below, $a_{prior}$ is also simply referred to as a.

The procedure of FIG. 2 thus makes it possible to ascertain a subjective logic opinion about the criticality of a current situation s for a criticality estimation with subjective logic.

Through corresponding normalization, the sums of the individual probabilities b and d do not add up to one but leave a residual probability u that a new data point does not belong to any known cluster. This probability forms the statistical uncertainty u of the subjective logic opinion.

As an alternative to a VAE network 201, a Gaussian mixture model, a latent Dirichlet allocation, a Dirichlet-Boltzmann machine, a deep belief network, an adversarial generative neural network, or variations of autoencoder networks can also be used. In addition, instead of using the feature space 203 (latent space), i.e., of ascertaining the consistency measure by operations in the feature space 203 as described above, the decoder 204 of the VAE 201 can also be used to determine an error measure, which can then likewise be converted into an epistemic subjective logic opinion (which can be used as a consistency measure for the respective input data point).

Example Embodiment 2 for Consistency Measure: Reliability of the Trajectory Prediction Through Consistency Testing In this embodiment example, the reliability of the trajectory prediction for other road users is (if necessary, additionally) assessed by checking the consistency of temporarily stored, past predictions (which the control software 107 has ascertained, for example from previous input data 109) with the current and/or previous input data 109 (i.e., current or past measurements of the actual behavior of the other road users). For the trajectory prediction, the control software contains, for example, a prediction module (e.g., as one of the one or more ML models), such as a multiple trajectory prediction neural network.

In this case (now for trajectory predictions for other road users with input data 109, such as current or previous measurements of the actual trajectories of the other road users), the consistency measure can again be formulated as a binomial epistemic subjective logic opinion.

For this purpose, earlier trajectory predictions (predicted trajectory hypotheses) are, for example, represented as probability distributions and the probability of a currently measured trajectory of a road user (or, depending on the application, of another object expressed by one or more measured states, such as waypoints) belonging to the closest trajectory hypothesis of an earlier prediction is selected as the belief mass b. The probability that the measured trajectory does not fit into any trajectory hypothesis of the earlier prediction is selected as the disbelief mass d, wherein the epistemic uncertainty u as before results as the residual sum to one.

Alternatively, a frequentistic subjective logic opinion can be generated by representing each trajectory hypothesis as trajectory points (waypoints) over time and by checking whether the distance of a measured state (i.e., of a state from a measured trajectory) to the nearest trajectory point falls below or exceeds a specified threshold. These binary results form a sample for which the frequentistic subjective logic opinion is constructed via the relative frequency. See, for example, reference [1] for the special case of a single trajectory prediction.

A trajectory prediction for one or more road users can generally be considered an environmental model (i.e., a model for the environment) of a robotic device (in this case, a vehicle). This environmental model can be ascertained for each time point of a sequence of time points (e.g., control time points for which one or more control actions are selected in each case).

Example Embodiment 3 for Consistency Measure: Consistency of Perception with Semantic Map In this embodiment example, the consistency between the input data 109 (e.g., perception information) and a map is (if necessary, additionally) checked. For this purpose, perception information from different vehicle sensors is, for example, converted into a representation from a bird's eye view and compared to a digital map stored in the vehicle. As described above, a consistency measure can again be determined by means of pre-processing modules, such as lane recognition.

For example, the consistency of input data 109 with a map can be assessed as low if the input data 109 provide the information that the vehicle is moving across a location where a building is located according to the map.

A map can be considered as an example of reference information about the environment that is constant over a plurality of control time points (since the map remains the same until it is updated). This reference information thus represents in this sense (possibly static) prior knowledge for the current control time point. Prior knowledge can in this case be understood to mean that it includes information that is already known before a particular task is performed (in this case, the control at the control time points or at least the current control time points). In the present application, this can be information that is known prior to the start of a journey or of a particular route and helps the vehicle to better understand its environment.

Example Embodiment 4 for Consistency Measure: Consistency of Detected Objects from Different Sensor Modalities In this embodiment example, the consistency of sensor data elements (e.g., a plurality of camera images) contained in the input data 109 is assessed (if necessary, additionally) by assessing, for example, the consistency of object detections from different camera images (or sensor data elements of different sensors) taken at the same time, or also of the object detections over time (in each case from a camera image of a sequence of camera images). For this purpose, for example, the object detections of in each case two sensor data elements (from different sensors or from different times, with one corresponding to the current input data 109) are checked for consistency in the common viewing range (i.e., a measure of how well the object detections for the two sensor data elements fit together is ascertained. In the example of camera images, this can take place, for example, by respectively surrounding features (e.g., detected objects) with a tolerance and by counting how many features in one camera image have matches in another camera image (local matching). In so doing, mismatches (i.e., features that do not have a match) can also be counted, and a subjective logic opinion can then be ascertained by dividing matches and mismatches by the total number of features plus two. The greater the probability projected, the better. In addition, the newly added object hypotheses of a (current) time step can also be checked for consistency with the temporally filtered objects of the last time step. This can take place by projecting object hypotheses of the last time step onto the current time step and counting how many objects from the last time step can be associated with object hypotheses from the current time step (belief). Then, it is counted how many neither could be associated nor come from a spawn zone, i.e., an area where new objects are typically expected to "arise" (disbelief). The uncertainty is obtained via the total number of associations. The greater the projected probability, the better. The consistency measure can then again be ascertained as described for the above examples.

The previous embodiment examples for the consistency measure describe various possibilities of how a consistency measure for current input data 109 (i.e., for information ascertained for a respective ("current") control time point) can be ascertained with regard to various aspects (which may, if necessary, be ascertained on the basis of data derived therefrom, such as an object detection).

According to various embodiments, a plurality of consistency measures is ascertained (e.g., according to a plurality of the embodiment examples described above), i.e., consistency measures with regard to a plurality of aspects are ascertained, (e.g., by the control software) and fused to form a combined (or fused or total) consistency measure.

In order to further improve the result and increase the validity, this can include filtering over time (i.e., included are not only consistency measures for information about the environment for a current control time point but also consistency measures (if necessary, the combined consistency measure) for one or more earlier (i.e., previous) control time points (as a consequence of control time points).

Figure 3:
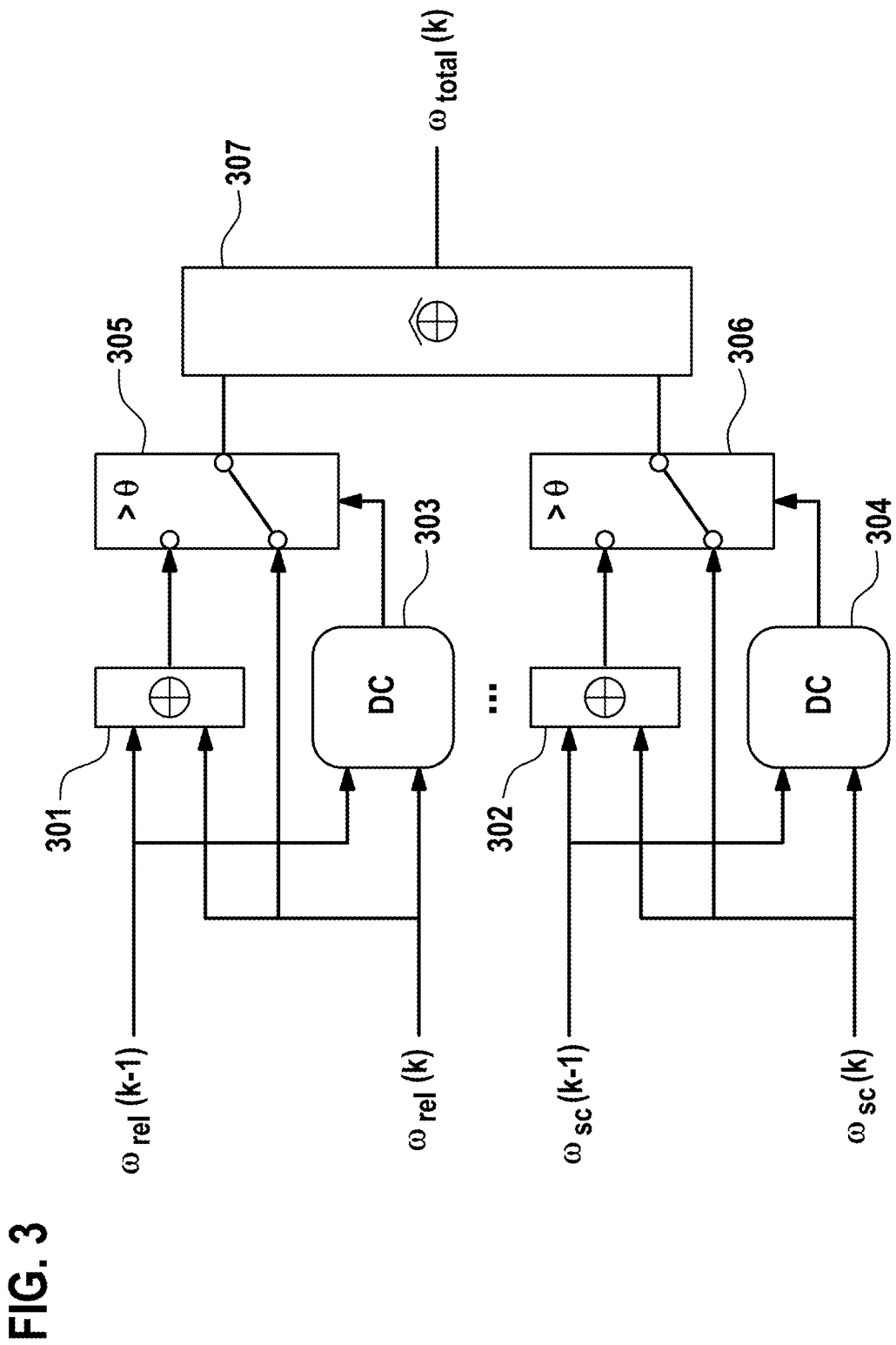
FIG. 3 illustrates a fusion of consistency measures according to one example embodiment of the present invention.

FIG. 3 illustrates a fusion of consistency measures according to one embodiment.

In the example of FIG. 3, a fusion mechanism is used, in which a consistency measure in the form of a subjective logic opinion $\omega_{rel}$ with regard to the reliability of the perception (see embodiment examples for the consistency measure 3 and 4) and a consistency measure in the form of a subjective logic opinion with regard to the criticality of the situation from empirical knowledge $\omega_{SC}$ (see embodiment example 1 for the consistency measure) are fused (due to the temporal filtering performed, in each case indexed with the control time index k).

First, the consistency measures $\omega_{rel}(k)$ and $\omega_{SC}(k)$ are fused by means of a respective application of the cumulative belief fusion operator 301, 302 with their respective value from the previous time step $\omega_{rel}(k-1)$ and $\omega_{SC}(k-1)$, respectively, and are checked by means of a respective application of the degree-of-conflict operator 303, 304 for consistency with their respective value from the previous time step $\omega_{rel}(k-1)$ and $\omega_{SC}(k-1)$, respectively.

The cumulative belief fusion operator 301, 302 is given in the present example of the consistency measures $\omega_{rel}=(b_{rel}, d_{rel}, u_{rel}, a_{rel})$ and $\omega_{SC}=(b_{SC}, d_{SC}, u_{SC}, a_{SC})$ (index k is omitted here for simplicity) by $$\omega_{rel} \oplus \omega_{SC} = \qquad (2)$$
$$\left( \frac{b_{rel}u_{SC} + b_{SC}u_{rel}}{u_{rel} + u_{SC} - u_{rel}u_{SC}}, \frac{d_{rel}u_{SC} + d_{SC}u_{rel}}{u_{rel} + u_{SC} - u_{rel}u_{SC}}, \right.$$
$$\left. \frac{u_{rel}u_{SC}}{u_{rel} + u_{SC} - u_{rel}u_{SC}}, \frac{a_{rel}u_{SC} + a_{SC}u_{rel} - (a_{rel} + a_{SC})u_{rel}u_{SC}}{u_{rel} + u_{SC} - 2u_{rel}u_{SC}} \right)$$

The degree of conflict is given in the present example by $$DC(\omega_{rel}, \omega_{SC}) = \qquad (3)$$
$$\frac{1}{2}(|b_{rel} + u_{rel}a_{rel} - (b_{SC} + u_{SC}a_{SC})| + |d_{rel} + u_{rel}(1 - a_{rel}) - (d_{SC} + u_{SC}(1 - a_{SC}))|)(1 - u_{rel})(1 - u_{SC})$$

If the degree of conflict falls below a specified threshold value, the previous and current subjective logic opinions are respectively classified as consistent and the value generated by the respective cumulative belief fusion operator 301, 302 (i.e., the fusion of the previous and current subjective logic opinions) is passed by a respective selection function 305, 306. Otherwise, the respective selection function 305, 306 passes the current value of the subjective logic opinion.

In this case, the fusion result of the cumulative belief fusion operator 301, 302 for the previous time step can again be used for the respective consistency measure from the previous time step $\omega_{rel}(k-1)$ or $\omega_{SC}(k-1)$ itself so that the consistency measures are aggregated over time (except for "resetters" if the current consistency measure is not consistent with the consistency measure from the previous time step, since the respective selection function 305, 306 in this case passes the current consistency measure as described).

The outputs of the selection functions 305, 306 are combined by means of the uncertainty weighted average belief fusion operator to form a fused (total) subjective logic opinion $\omega_{total}(k)$.

If the outputs of the selection functions 305, 306 are denoted by $\omega_A=(b_A,d_A,u_A,a_A)$ or $\omega_B=(b_B,d_B,u_B,a_B)$, the uncertainty weighted average belief fusion operator 307 is given by $$\omega_A \hat{\oplus} \omega_B = \qquad (4)$$
$$\left( \frac{b_A(1-u_A)u_B + b_B(1-u_B)u_A}{(1-u_B)u_A + (1-u_A)u_B}, \frac{d_A(1-u_A)u_B + d_B(1-u_B)u_A}{(1-u_B)u_A + (1-u_A)u_B}, \right.$$
$$\left. \frac{((1-u_A)+(1-u_B))u_A u_B}{(1-u_B)u_A + (1-u_A)u_B}, \frac{a_A(1-u_A) + a_B(1-u_B)}{(1-u_A)+(1-u_B)} \right)$$

General versions of the formulas (2), (3), and (4) are given in reference [1].

If more than two consistency measures are to be combined, the fusion mechanism of FIG. 3 can be cascaded, for example.

The temporal filtering contained in the fusion mechanism described with reference to FIG. 3 makes it possible to aggregate information over long time windows (if, as described above, the fusion result of the cumulative belief fusion operator 301, 302 for the previous time step is again used for the respective consistency measure from the previous time step $\omega_{rel}(k-1)$ and $\omega_{SC}(k-1)$ itself) and thereby to (potentially) achieve high noise suppression.

On the other hand, by means of the switching behavior (by the selection functions 305, 306 depending on the consistency of the successive consistency measures), the temporal filtering can quickly respond to abrupt changes in the consistency measures. In the event of a jump, the uncertainty of the result first increases sharply and is therefore weighted less strongly by the fusion operator (i.e., the uncertainty weighted average belief fusion operator according to equation (4)). This effect is desired since, immediately after a jump, the validity of the corresponding consistency measure is usually not yet high.

If the correlation of individual data points in the input data 109 is not negligibly small but estimable, the consistency measures can be corrected by using the trust discounting operator. For example, if a single trajectory is checked on the basis of a plurality of measurements (i.e., data points in the input data 109), the individual measurements (data points) are not statistically independent, since they refer to the same data source, for example. Nevertheless, a plurality of measurements results in an added value here. The correlation would be estimable here through expert knowledge. This can also prevent that the epistemic uncertainty u decreases too quickly and the fusion (i.e., the cumulative belief fusion operator according to equation (2)) takes the newly incoming data into account less and less.

The fused subjective logic opinion $\omega_{total}(k)$ is converted (e.g., by the control software) into a probability. For subjective-logic-based embodiments, the probability can be calculated either directly from the projected probability pant=b+a u from the subjective logic opinion, or by integrating the Dirichlet distribution, corresponding to the subjective logic opinion, over a specified confidence interval. A softmax function can be used for confidence scores. Below, the probability $p_{ant}(k)$ thus generated is considered the fused consistency measure for the k-th control time point, with $p_{ant}(t)$ also being used below, wherein t is the time corresponding to a respective control time point.

For example, the fused consistency measure is the result of an analysis module and is further processed by a planning module (both modules are, for example, part of the control software 107). The analysis module thus includes input data 109, such as perception information (from sensors or also other vehicles) and possibly prior knowledge (such as a map), and the analysis module provides the fused consistency measure (and possibly also the individual consistency measures). The planning module generates a trajectory (i.e., an intended route) therefrom, and the control unit controls the vehicle so that it follows the generated trajectory.

In parallel to the analysis module, one or more further analysis modules that prepare the perception information for the planning module can be provided. The information (e.g., perception information) supplied to the analysis module can be the result of pre-processing, i.e., the analysis module does not need to be supplied with (only) the input data themselves 109, but it can also be supplied (if necessary, additionally) with the result of pre-processing. For example, lane recognition can support the consistency checking of map and vehicle perception by the analysis module. The planning module can have further inputs in addition to the output of the analysis module.

In the planning module, in the present application example of a vehicle control, the fused consistency measure $p_{ant}(t)$ is used to affect the driving behavior. This can take place in a variety of ways. The planning module can furthermore be structured differently. For example, the planning module can be broken down into strategic, tactical, and operational planning. One or more of these components of the planning module can be influenced by the fused consistency measure $p_{ant}(t)$.

For example, the planning module can compare the combined consistency measure to a threshold value (which is defined depending on the scaling of the consistency measure or the respective metric according to which it is determined) and, depending on whether the consistency specified thereby is below a minimum consistency specified by the threshold value, can switch into a safe control mode.

In one embodiment, the planning module takes the fused consistency measure as one of its inputs and uses an optimization-based approach to determine a trajectory therefrom, which is output by it (and according to which the control unit 102 controls the vehicle). For example, the fused consistency measure is included in the optimization function as follows:

$$J_{ges} = J_{gew} + w_{ant} \int v(t) \cdot (1 - p_{ant}(t)) dt \qquad (5)$$

In this case, $J_{ges}$ is a modified quality function, which in addition to the terms of a conventional quality function $J_{gew}$ contains an additive term (i.e., a one-dimensional penalty term in the cost function) that consists of the integral, weighted with the optimization weight want, over the product of the planned velocity v(t) and the complementary probability to $p_{ant}$ (t). By minimizing $J_{ges}$, trajectories that, at low consistency (near zero), lead to the selection of a slower trajectory for the automated vehicle are consequently preferred. On the other hand, for a very high consistency measure (near one), the additive term becomes vanishingly small, as a result of which the planning costs according to the conventional quality function $J_{gew}$ prevail.

In a further embodiment, the planning module also uses an optimization-based approach to determine a trajectory, but, in contrast to the above embodiment example, the planning module includes a multidimensional probability distribution f(x,t), which describes the probability that a particular state x is impermissible at a particular time point t. The probability distribution does not need to take into account all aspects under which a state can be invalid. For example, the probability distribution can represent the current and predicted states of other road users and be provided by another module. The integral of the probability distribution along the planned trajectory is included in the quality function of the planning module so that the resulting trajectory has as little probability as possible of containing invalid states. Moreover, the integral of the probability distribution over the trajectory is limited to a maximum allowable residual probability.

This probability distribution includes the fused consistency measure. For example, an original version of the probability distribution f(x, t) provided by the other module is modified as follows:

$$\tilde{f}(x, t, p_{ant}) = n \cdot [(1 - p_{ant}(t)) + p_{ant}(t) \cdot f(x, t)], \qquad (6)$$

where n is a normalization constant. Since $\tilde{f}(x,t,p_{ant})$ increases with decreasing consistency probability $p_{ant}(t)$, i.e., the probability that a trajectory contains impermissible states, an optimization on the basis of the probability distribution $\tilde{f}(x,t,p_{ant})$ in this case generates a trajectory that represents an overall more cautious behavior (than when f(x, t) is used). In the limit case $p_{ant}(t)=0$, f would thus ignore the entire distribution information from f since this information was assessed as completely meaningless.

In a further embodiment, the consistency measure is included as a boundary condition in the planning performed by the planning module, wherein the planning module determines a required consistency measure (e.g., as a confidence measure) or required consistency measures with respect to various aspects for the planned trajectory. By the planning module allowing only trajectories for which a required (e.g., combined) consistency measure or respectively required consistency measures are sufficient, a required reliability, which is represented by the consistency measure or the consistency measures, can be maintained throughout. For example, the planning module for driving behavior, which relies on perception information from other road users or infrastructure units, i.e., requires external perception information, can require a minimum consistency measure with respect to the external perception information.

As a further example, the planning module for more complex driving behavior can require higher total consistency. If this higher total consistency is not achieved, the planning module regresses to a less complex, but possibly also less preferred, behavior. For example, in the case of poor visibility and thus low consistency between radar and camera, the ego vehicle would be prevented from overtaking a preceding vehicle.

Figure 4:
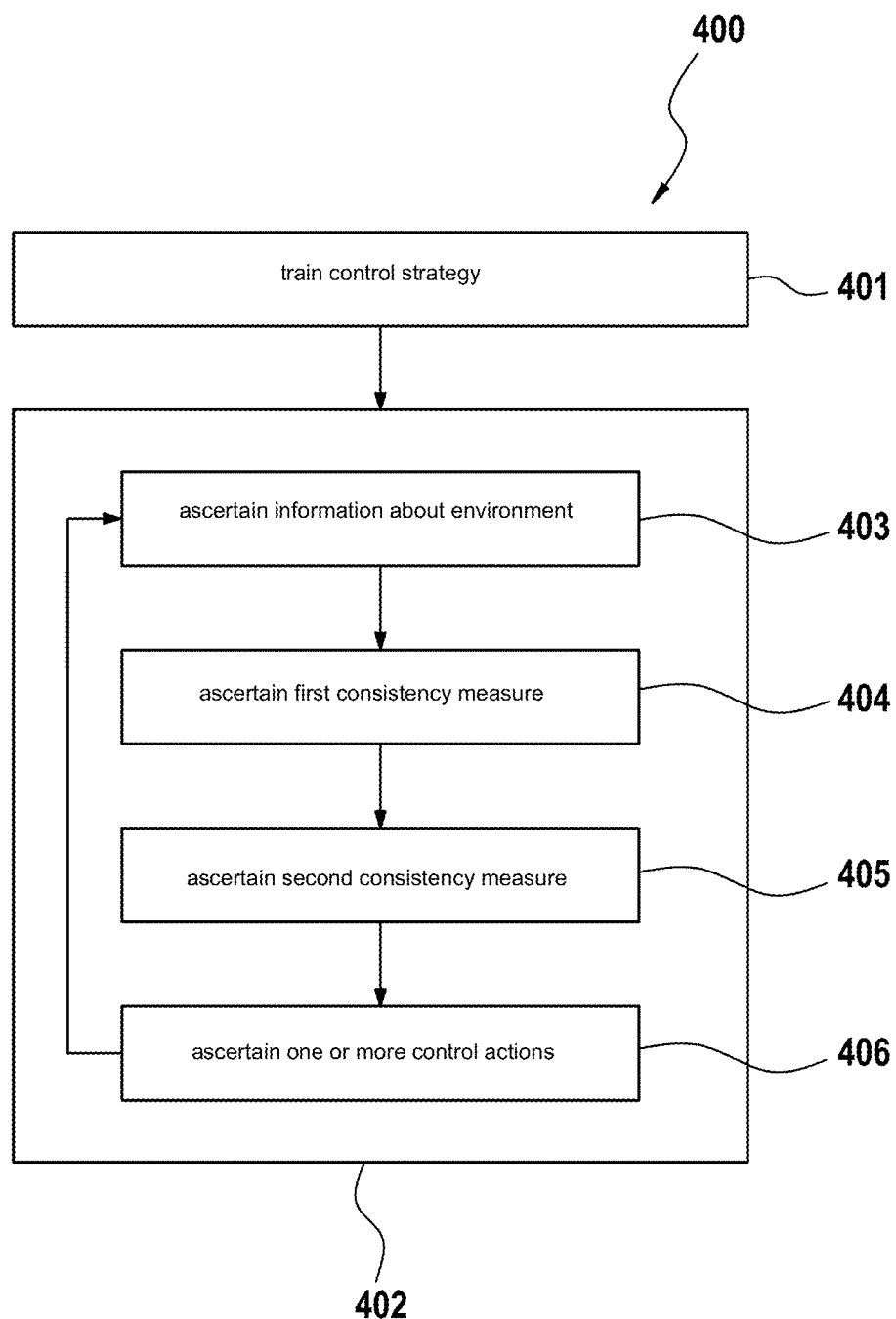
FIG. 4 shows a flowchart illustrating a method for controlling a robotic device according to one example embodiment of the present invention.

In summary, according to various embodiments, a method as shown in FIG. 4 is provided.

FIG. 4 shows a flowchart 400 illustrating a method for controlling a robotic device according to one embodiment.

In 401, a control strategy for the robotic device is trained on the basis of a plurality of training control situations.

It should be noted that the control strategy does not necessarily have to output control signals directly but can also output control actions at a higher level (e.g., trajectories, waypoints, etc.), for which suitable control signals are then ascertained.

In 402, for each of a plurality of control time points, information about an environment of the robotic device for the control time point is ascertained in 403;

a first consistency measure for the information ascertained for the control time point is ascertained in 404 by comparing a control situation specified by the information ascertained for the control time point, to the training control situations (see, for example, embodiment example 1 for the consistency measure);

at least one second consistency measure for the information ascertained for the control time point is ascertained in 405 by comparing the information ascertained for the control time point, to a prediction for the condition of the environment from information about the environment of the robotic device for one or more previous control time points (e.g., a trajectory prediction, see, for example, embodiment example 2 for the consistency measure), to prior knowledge (such as a map, see, for example, embodiment example 3 for the consistency measure) to one another (i.e., internal consistency, for example that measurements or information derived therefrom, such as object detections, fit to one another, see, for example, embodiment example 4 for the consistency measure), and/or to the information ascertained for one or more previous control time points (such as an object detection to a previous object detection, see, for example, embodiment example 4 for the consistency measure);

a combined consistency measure is ascertained in 405 by combining (fusing) the first consistency measure with the at least one second consistency measure; and one or more control actions for the robotic device are ascertained in 406 depending on the combined consistency measure (and, if necessary, controlling the robotic device according to the ascertained control actions).

The consistency measures and the combined consistency measure can be ascertained by an analysis module and, depending on the output thereof, a planning module can ascertain the control actions.

Comparing data or information is, for example, to be understood as determining a distance in the sense of a respective distance measure (or metric) with which the consistency measure between the two respective data or pieces of information is determined, as described in the above embodiment examples for the consistency measure.

In other words, according to various embodiments, one or more consistency measures with regard to various aspects, such as consistency of current input data with trajectory predictions or consistency of current input data with a map (i.e., prior knowledge), are combined with a consistency of a current control situation (as reflected in input data) with training situations to form a combined consistency measure. Depending on this combined consistency measure, a control is then performed. If the combined consistency (as specified by the combined consistency measure) is below a specified threshold value, control can, for example, take place according to a safe mode, for example an autonomous vehicle can drive cautiously.

One or more of the consistency measures can, for example, be ascertained as a binomial epistemic subjective logic opinion. For example, it is also possible to ascertain multimodal trajectory predictions, whose consistency is assessed on the basis of measurements (measurement values).

A prediction can, for example, be taken into account in the control. In this respect, ascertaining a consistency measure for the ascertained information can also be considered as an assessment of the prediction, i.e., a low consistency between prediction and ascertained information can indicate both a low quality of the ascertained information and a poor prediction. In both cases, cautious control can be appropriate.

The method of FIG. 4 can be performed by one or more computers comprising one or more data processing units. The term "data processing unit" can be understood to mean any type of entity that makes the processing of data or signals possible. The data or signals can, for example, be processed according to at least one (i.e., one or more than one) specific function performed by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a programmable gate array (FPGA), or any combination thereof. Any other way of implementing the respective functions described in more detail here can also be understood as a data processing unit or logic circuitry. One or more of the method steps described in detail here can be performed (e.g., implemented) by a data processing unit by means of one or more specific functions performed by the data processing unit.

According to various embodiments of the present invention, the method is thus, in particular, computer-implemented.

The term "robotic device" can be understood as relating to any technical system (with a mechanical part whose movement is controlled), such as a computer-controlled machine, a vehicle, a household appliance, an electric tool, a manufacturing machine, a personal assistant, or an access control system.

Various embodiments can receive and use sensor signals from various sensors, such as video, radar, LiDAR, ultrasound, movement, thermal imaging, etc. as the information about an environment or as the basis for the information about the environment, for example in order to obtain sensor data with regard to states of the respective system (robotic device and object or objects in the environment) and configurations and scenarios. The sensor data can be processed in order to ascertain the information about an environment. This can comprise classifying the sensor data or performing a semantic segmentation of the sensor data, for example in order to detect the presence of objects (in the environment in which the sensor data were obtained). Embodiments can be used to train a machine learning system and to control a robot, for example by robot manipulators autonomously, in order to accomplish various manipulation tasks in various scenarios. In particular, embodiments are applicable to the control and monitoring of the performance of manipulation tasks, for example in assembly lines.

What is claimed is:

1. A method for controlling a robotic device, comprising:
    training a control strategy for the robotic device based on a plurality of training control situations; and,
    for each of a plurality of control time points:
        ascertaining information about an environment of the robotic device for the control time point,
        ascertaining a first consistency measure for the information ascertained for the control time point, by comparing a control situation specified by the information ascertained for the control time point, to the training control situations,
        ascertaining at least one second consistency measure for the information ascertained for the control time point, by comparing the information ascertained for the control time point:
            to a prediction for a state of the environment from information about the environment of the robotic device for one or more previous control time points, and/or
            to prior knowledge, and/or
            to one another, and/or
            to the information ascertained for one or more previous control time points to the information ascertained for one or more previous control time points,
        ascertaining a combined consistency measure by combining the first consistency measure with the at least one second consistency measure, and
        ascertaining one or more control actions for the robotic device depending on the combined consistency measure.

2. The method according to claim 1, wherein the first consistency measure and the at least one second consistency measure are subjective logic opinions, and combining the first consistency measure with the at least one second consistency measure is a fusion in the sense of at least one subjective logic fusion operator.

3. The method according to claim 2, wherein the first consistency measure and the at least one second consistency measure are combined by applying uncertainty weighted average belief fusion operators.

4. The method according to claim 1, wherein the first consistency measure and the second consistency measure are Dempster-Shafer belief masses.

5. The method according to claim 4, wherein the first consistency measure and the at least one second consistency measure are subjective logic opinions and the first consistency measure and/or the at least one second consistency measure are temporally filtered by applying a cumulative belief fusion operator.

6. The method according to claim 5, wherein, when temporally filtering the first consistency measure and/or the at least one second consistency measure, a current value of the first and/or second consistency measure is taken as a result of the temporal filtering for the respective consistency measure when a result of a degree of conflict with a previous result of the filtering is above a specified threshold value.

7. The method according to claim 1, wherein the first consistency measure and the second consistency measure are determined using Bayesian inference.

8. The method according to claim 1, wherein the combining of the first consistency measure with the at least one second consistency measure includes temporally filtering the first consistency measure and/or the second consistency measure and combining the first consistency measure or filtered first consistency measure with the second consistency measure or filtered second consistency measure.

9. The method according to claim 1, wherein the first consistency measure and/or the at least one second consistency measure is ascertained based on a plurality of measurement values, wherein a significance of the measurement values is reduced depending on their correlation using a confidence reduction.

10. The method according to claim 1, wherein the information includes an environmental model.

11. The method according to claim 1, wherein the ascertaining of the one or more control actions depending on the combined consistency measure includes ascertaining the one or more control actions based on a quality function which assesses control actions and includes the combined consistency measure.

12. A control unit configured to control a robotic device, the control unit configured to:
    train a control strategy for the robotic device based on a plurality of training control situations; and,
    for each of a plurality of control time points:
        ascertain information about an environment of the robotic device for the control time point,
        ascertain a first consistency measure for the information ascertained for the control time point, by comparing a control situation specified by the information ascertained for the control time point, to the training control situations,
        ascertain at least one second consistency measure for the information ascertained for the control time point, by comparing the information ascertained for the control time point:
            to a prediction for a state of the environment from information about the environment of the robotic device for one or more previous control time points, and/or
            to prior knowledge, and/or
            to one another, and/or
            to the information ascertained for one or more previous control time points to the information ascertained for one or more previous control time points,
        ascertain a combined consistency measure by combining the first consistency measure with the at least one second consistency measure, and
        ascertain one or more control actions for the robotic device depending on the combined consistency measure.

13. A non-transitory computer-readable medium on which is stored commands controlling a robotic device, the commands, when executed by a computer, causing the computer to perform the following steps:
    training a control strategy for the robotic device based on a plurality of training control situations; and,
    for each of a plurality of control time points:
        ascertaining information about an environment of the robotic device for the control time point,
        ascertaining a first consistency measure for the information ascertained for the control time point, by comparing a control situation specified by the information ascertained for the control time point, to the training control situations,
ascertaining at least one second consistency measure for the information ascertained for the control time point, by comparing the information ascertained for the control time point:
- to a prediction for a state of the environment from information about the environment of the robotic device for one or more previous control time points, and/or
- to prior knowledge, and/or
- to one another, and/or
- to the information ascertained for one or more previous control time points to the information ascertained for one or more previous control time points, ascertaining a combined consistency measure by combining the first consistency measure with the at least one second consistency measure, and
ascertaining one or more control actions for the robotic device depending on the combined consistency measure.

* * * * *